Patented Aug. 31, 1943

2,328,370

UNITED STATES PATENT OFFICE 2,328,370

KETO CARBOXYLIC ACID DERIVATIVES

Georg Wiest, Ludwigshafen-on-the-Rhine, Germany; vested in the Alien Property Custodian No Drawing. Application December 24, 1940, Serial No. 371,593. In Germany February 12, 1940

9 Claims. (Cl. 260—464)

The present invention relates to keto carboxylic acid derivatives.

I have found that keto carboxylic acid derivatives may be prepared very easily and with good yields by causing a functional derivative of a carboxylic acid containing a reactive $CH_2$-group in alpha-position to the modified carboxylic acid group to act on more than the equimolecular amount of a vinyl ketone in the presence of an alkaline catalyst.

Functional carboxylic acid derivatives of the said kind are in particular the esters, amides or nitriles of acetic acid which is substituted by a radicle containing multiple bonds, the latter being attached to the atom which is adjacent to the $CH_2$-group. Such radicles which are sometimes defined as acidifying radicles are for example the

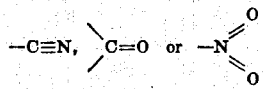

group and aryl radicles. Suitable starting materials of this kind are for example the esters, amides or nitriles of cyano acetic acid, aceto acetic acid or phenyl acetic acid. Suitable vinyl ketones, i. e. ketones containing the radicle

are in particular vinyl methyl and ethyl ketone, vinyl phenyl ketone and vinyl benzyl ketone.

The reaction consists in the addition of two molecular proportions of the vinyl ketone to one molecular proportion of the carboxylic acid derivative and proceeds in accordance with the following equation showing the reaction between vinyl methyl ketone and cyano acetic acid ethyl ester.

$2CH_2=CH-CO-CH_3 + N{\equiv}C-CH_2-COOC_2H_5 \longrightarrow$

Vinyl methyl ketone      cyano acetic acid ethyl ester

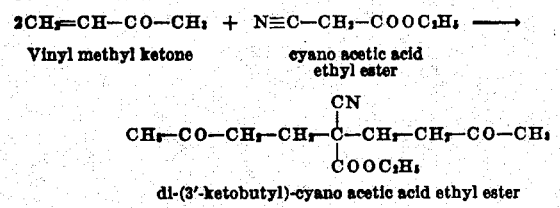

di-(3'-ketobutyl)-cyano acetic acid ethyl ester

The reaction products therefore constitute aliphatic 1.7-diketones which are disubstituted in 4-position, one substituent being a modified carboxylic acid group, the other being a radicle containing multiple bonds. They correspond to the general formula

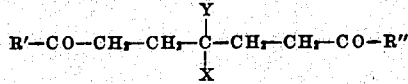

wherein R' and R'' represent alkyl, aralkyl or aryl radicles, X stands for a modified carboxylic acid group and Y for the radicle containing multiple bonds.

In addition to these bimolecular addition products, there may be formed as by-products compounds formed by the addition of one molecular proportion of the vinyl ketone to one molecular proportion of the carboxylic acid derivative, in particular if less than two molecular proportions of the vinyl ketone is allowed to act on one molecular proportion of the carboxylic acid derivative. These monomolecular addition products may easily be converted into bimolecular addition products by bringing them into contact with vinyl ketones in the presence of alkaline catalysts. It is also possible to add these monomolecular addition products to the starting materials used in the practice of my invention.

The addition of vinyl ketones to carboxylic acid derivatives containing $CH_2$-groups proceeds so smoothly that the reaction may be started simply by adding one of the starting materials to the other starting material admixed with the catalyst. The reaction proceeds with the evolution of heat. Since vinyl ketones are liable to be polymerized at high temperatures, temperatures exceeding about 100° C., preferably those exceeding 70° C. should not be used. If necessary, the reaction mixture has to be cooled during the reaction. When the vigor of the reaction has abated, it may be suitable to gently heat the reaction mixture in order to accelerate the reaction. The reaction may be carried out in the presence of inert solvents or diluents.

Various alkaline substances may serve as the catalyst. Thus, the alkali and alkali earth metals themselves and their compounds having an alkaline reaction are suitable, for example, their oxides, hydroxides or alcoholates. Basic nitrogen compounds may also be used, as for example pyridine. The amount of catalyst to be used may be very small; generally speaking a few per cent or less than one per cent thereof, calculated on the amount of the carboxylic acid derivative are sufficient. It is not necessary to use higher amounts of the catalyst, e. g. amounts exceeding 10 per cent of the acid derivative.

In order to avoid the polymerization of the vinyl ketones during the reaction, polymerization inhibitors, such as copper or hydroquinone, may be added to the reaction mixture.

The products obtainable according to my invention may be used for the production of keto carboxylic acids by saponifying the modified carboxylic acid group. The esters of these carboxylic acids are most suitable as plasticizers or solvents.

The following examples will further serve to illustrate how my invention may be carried out in practice. The invention is not restricted to these examples. The parts are by weight.

*Example 1*

700 parts of vinyl methyl ketone are allowed to flow into 560 parts of cyano acetic acid ethyl ester which has been admixed with 1 part of pulverized sodium metal, while stirring. The temperature is kept at 30 to 40° C. The reaction mixture is allowed to stand for 12 hours; it is then admixed with an amount of a mineral acid equivalent to the sodium metal and dried with sodium sulfate. By distilling the mixture there is obtained a colorless liquid boiling at 150 to 155° C. under a pressure of 0.6 millimeter (mercury gauge). It contains 2 molecular proportions of vinyl methyl ketone per one molecular proportion of cyano acetic acid ethyl ester and corresponds to the formula

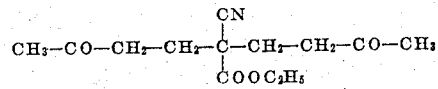

A similar result is obtained when using sodium hydroxide or cyclohexylamine as the catalyst.

*Example 2*

140 parts of methyl vinyl ketone are allowed to flow in the course of 30 minutes into a mixture of 160 parts of malonic acid diethyl ester, 1 part of hydroquinone and 1.5 parts of metallic sodium, while stirring and cooling to 25° C. The reaction mixture is allowed to stand for some hours and dissolved in ether. The ethereal solution is extracted with dilute acetic acid and with water and then dried with calcium chloride. After having driven off the ether, the reaction product is distilled in vacuo. An oily product, boiling at 174–175° C. under 2 millimeters pressure is obtained which corresponds to the formula $C_{15}H_{24}O_6$

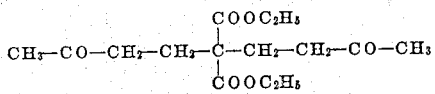

The product obtained in the same manner from methyl vinyl ketone and aceto acetic acid ethyl ester boils at 172–178° C. under 8.5 millimeters pressure under slight decomposition. The addition product of methyl vinyl ketone to phenyl acetic acid nitrile, prepared at 50–60° C., boils at 188–197° C. under 35 millimeters pressure under slight decomposition.

What I claim is:

1. A process for the production of keto carboxylic acid derivatives which consists in causing more than one molecular proportion of a vinyl ketone to act on one molecular proportion of a functional derivative of a carboxylic acid selected from the group consisting of esters, nitriles and amides thereof which contains in α-position to the modified carboxylic acid group a reactive $CH_2$-group in the presence of an alkaline catalyst.

2. A process for the production of keto carboxylic acid derivatives which consists in causing more than one molecular proportion of vinyl methyl ketone to act on one molecular proportion of a functional derivative of a carboxylic acid selected from the group consisting of esters, nitriles and amides thereof which contains in α-position to the modified carboxylic acid group a reactive $CH_2$-group in the presence of an alkaline catalyst.

3. A process for the production of keto carboxylic acid derivatives which consists in causing more than one molecular proportion of vinyl methyl ketone to act on one molecular proportion of a carboxylic acid nitrile which contains in α-position to the nitrile group a reactive $CH_2$-group in the presence of an alkaline catalyst.

4. A process for the production of keto carboxylic acid derivatives which consists in causing more than one molecular proportion of vinyl methyl ketone to act on one molecular proportion of cyano acetic acid ethyl ester in the presence of an alkaline catalyst.

5. Aliphatic 1.7-diketones disubstituted in the 4-position by a modified carboxylic acid group selected from the group consisting of ester, nitrile and amide groups and by an acidifying radicle.

6. 2.8-diketononane substituted in the 5-position by a carboxylic acid nitrile group and by an acidifying radicle.

7. 2.8-diketo-5-cyano nonane-5-carboxylic acid ethyl ester.

8. A process for the production of keto carboxylic acid derivatives which consists in causing more than one molecular proportion of vinylmethylketone to act on one molecular proportion of malonic acid diethylester in the presence of an alkaline catalyst.

9. The compound having the following formula:

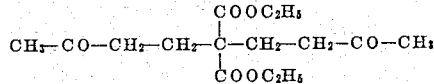

GEORG WIEST.